INVENTOR
WILBUR N. TORPEY

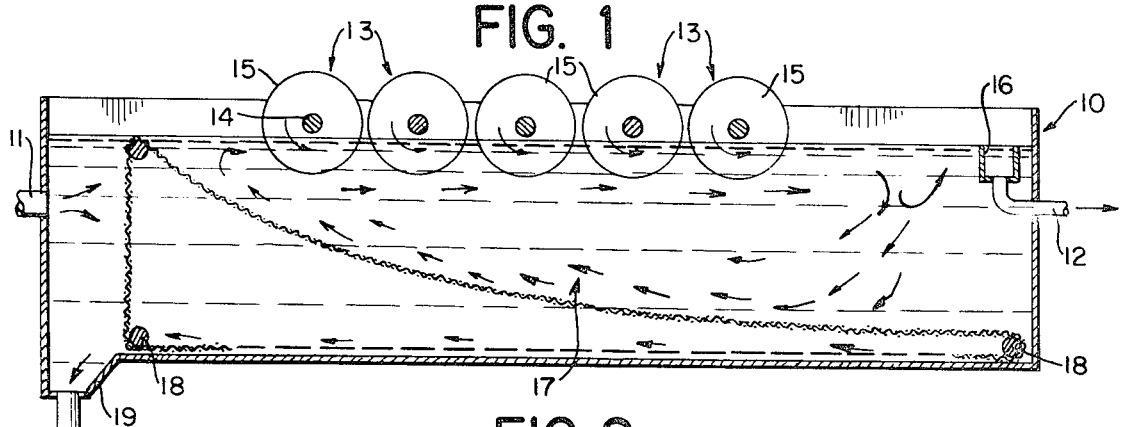
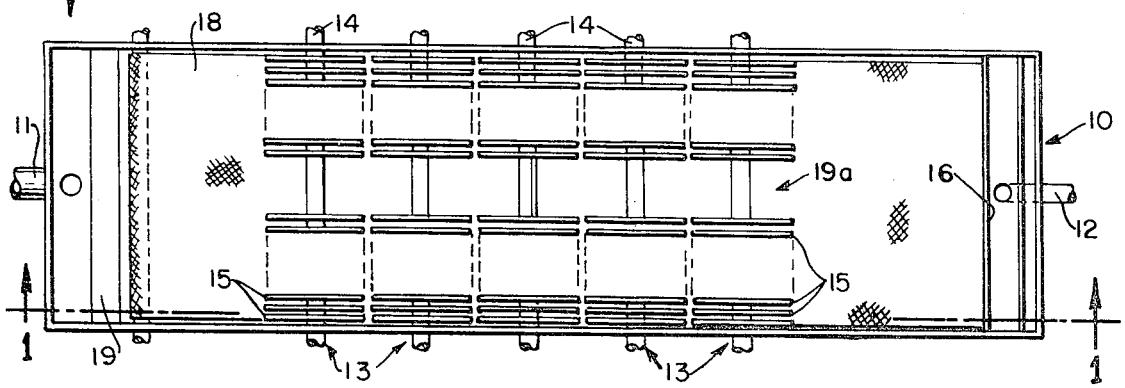
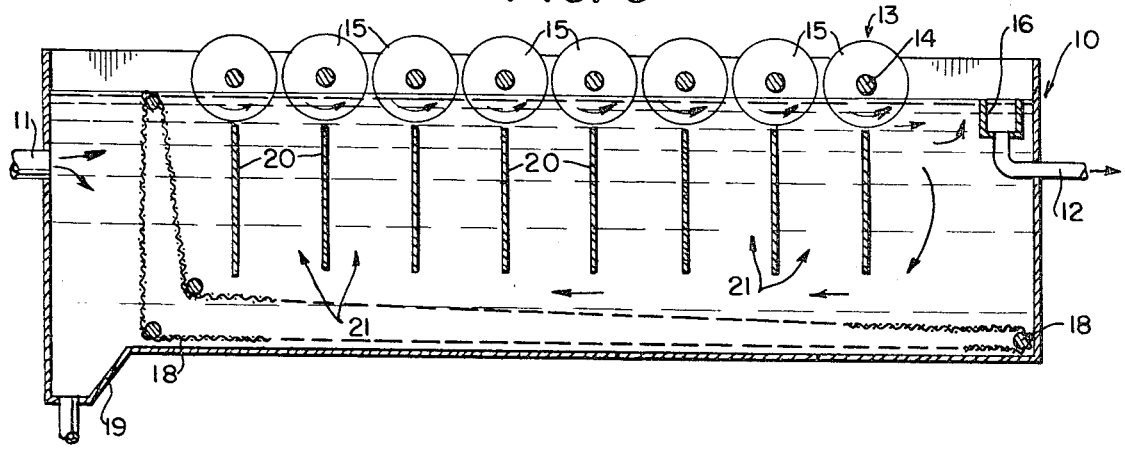

BY Mandeville & Schweitzer
ATTORNEYS

United States Patent Office 3,575,849
Patented Apr. 20, 1971

3,575,849
BIOLOGICAL TREATMENT OF WASTEWATER
Wilbur N. Torpey, 4023 Hanford St.,
Douglaston, N.Y. 11363
Filed Dec. 5, 1968, Ser. No. 781,452
Int. Cl. C02c 1/10
U.S. Cl. 210—14                                14 Claims

ABSTRACT OF THE DISCLOSURE

Method and apparatus for substantially upgrading the operating efficiency of wastewater treatment plants is disclosed. The invention utilizes forcibly rotating bodies that are partially submerged in the wastewater to provide surface area on which biological slimes develop and serve the purpose of removing pollutants from the wastewater. The rotating, partially submerged bodies are located in the upper portion of the treatment tanks, and, in addition to providing oxygen and nutrients for the growth and maintenance of biological slimes, serve to pump the wastewater to bring it in contact with the slimes. The treatment tank is thus divided into an upper biological treatment zone and a subjacent zone, through which solids are separated from the flow of wastewater and transported to a point of withdrawal from the system.

BACKGROUND OF THE INVENTION

This invention relates to the biological treatment of wastewater and provides a method and apparatus for achieving a high degree of wastewater treatment at a relatively low cost. More specifically, the invention is concerned with providing moving surfaces adequate for the growth of biological slimes that can be incorporated into treatment tank structures of existing plants or can be utilized as a basis in the design of future wastewater treatment plants.

The need for an advanced method for the clarification of wastewater has become of increasing concern to many governmental regulatory agencies. The combination of rapid growth of population and of industrial expansion in recent years has resulted in an alarming increase in the level of pollution of natural receiving waters such as lakes, rivers and streams. To remedy this situation, which has already reached critical proportions in some areas of the country, the facilities of existing wastewater treatment plants must be expanded or upgraded to improve their efficiency and new plants, capable of attaining higher efficiencies, must be provided.

At the present time there are three basic processes in widespread use for the treatment of wastewater. The first, and most widely used, of these processes is that of primary treatment employing plain sedimentation which effects the removal of the settleable solids from the wastewater. In some of these plants, chemical coagulants are used to enhance the operating efficiency. Such primary treatment removes from about 30 to 50% of the carbonaceous pollutants expressed as bio-chemical oxygen demand (B.O.D.).

The other treatment processes involve secondary treatment of the wastewater, which is accomplished generally by providing an environment conducive to the growth of biological slimes or flocs which utilize the pollutants in the usually presettled wastewater for their natural growth processes. The secondary treatment of wastewater is accomplished by providing means for bringing the wastewater in contact with the slimes or flocs so as to supply nutrients and oxygen to the microorganisms. Such biological slimes or flocs are subsequently separated from the wastewater thus effecting the necessary clarification. The prerequisites for the effective bio-extraction of pollutants from wastewater are, therefore, the continuous supply of nutrients necessary for the maintenance and growth of the microorganisms and oxygen adequate for their respiration.

The secondary treatment method known as the activated sludge process, along with such variations as modified aeration and step aeration, has gained widespread use over the past several decades. This process provides for the aeration of the wastewater in the presence of a controlled amount of free floating biological flocs. The microorganisms in the biological flocs extract the pollutants from the wastewater for their nutrition and are supplied with oxygen generally in the form of diffused air injected below the surface of the aeration tank. Pollutants are removed from the wastewater by conversion into biological slimes or flocs that are subsequently separated from the wastewater. The modified aeration process can be utilized to effect a removal of about 60% of the carbonaceous B.O.D. Other conventional forms of the activated sludge process remove up to about 90% of the carbonaceous B.O.D. and in many instances cause the oxidation of ammonia nitrogen.

The standard rate or high rate trickling filtration processes represent the third group generally used for the clarification of wastewater. These processes provide for passing presettled wastewater over slimes grown on and attached to stationary surfaces. Clarification is effected similarly to the activated sludge process in that organic pollutants in the wastewater are converted into biological slimes that are subsequently separated from the clarified liquor. Plants utilizing trickling filtration effect a carbonaceous B.O.D. removal of between 60 and 90 percent depending mainly on the loading rate of the facilities. The oxidation of ammonia is also effected in many plants.

In recent years, some experimental work has been done which was directed towards clarifying wastewater by the use of rotating bodies that are partially submerged in the wastewater. This work has shown that partially submerged rotating discs or drums provide a very suitable surface for the growth of biological slimes by exposing them alternately to the atmosphere to gain the oxygen necessary for their respiration and immersing them in the wastewater for the bio-extraction of pollutants for their nutrition. However, such partially submerged rotating bodies have not gained popularity in actual full scale because of technical and economic problems.

It is a primary objective of this invention to overcome the technical and economic problems that have prevented the widespread full scale use of partially submerged rotating bodies for the biological treatment of wastewater. The present invention provides a method and apparatus for upgrading existing primary or secondary wastewater treatment plants to remove a fraction or virtually all of the carbonaceous B.O.D. being discharged in the effluent. Moreover, the principles of the invention can be used in the design of new wastewater treatment plants to provide a biological method of achieving the removal of a fraction or substantially all the carbonaceous B.O.D. from the wastewater and for the oxidation of much of the ammonia in the wastewater if desired for a substantially lower cost than a prior art plant.

SUMMARY OF THE INVENTION

The invention provides for the incorporation of rotatable bodies in wastewater treatment tanks. The rotatable bodies, so used to afford contact surface for the growth of slimes, are supported on horizontal shafts which are, in turn, mounted on bearings near the surface of the wastewater in the tank. The rotatable bodies are partially immersed in the wastewater, and when rotated in accordance with the invention, provide surface area that is alternatively exposed to the atmosphere and imcouraged to grow on the surfaces of the rotating bodies by providing a substantially continuous supply of wastewater with its suspended and assorted nutrients as well as a supply of oxygen from the atmosphere.

Although the rotatable bodies of the invention may take different forms such as drums, cylinders or bushes, it has been found that a plurality of thin discs, closely spaced and supported on rotatable shafts, are most advantageous. In addition to facilitating a higher concentration of surface area per unit volume of treatment tank, closely spaced rotating discs can be used to impart a pumping effect on the wastewater. The discs of the invention can be constructed of many suitable materials, although plastics and lightweight metals are generally preferred.

In accordance with the invention, a plurality of parallel disc assemblies, each including a shaft supporting closely spaced discs, are rotatably mounted in the upper portion of a primary or secondary wastewater treatment tank. The discs are partially submerged in the wastewater, preferably in the range between ⅓ and ⅔ of their diameter, to convert the upper portion of the treatment tank into a biological treatment zone. The lower portion of the treatment tank is maintained in a relatively quiescent state, thus providing a subjacent settling zone for the separation from the flow of wastewater the excess biological slimes. To provide the proper contact between the slimes and the wastewater and between the slimes and the atmosphere without disturbing significantly the quiescence of the subjacent settling zone, the discs should be rotated at a peripheral velocity between about 0.5 and about 3.0 feet per second and they should not extend down below the midpoint of the tank. In practice, the diameter of the discs should lie in the range of about 3 to 12 feet depending to a large extent on tank depth, which is typically between 6 and 15 feet, and on the shape of the tank. It should be noted that, at present, it is proposed to utilize the same diameter discs throughout a given installation, although disc diameter may be varied between disc assemblies, if desired.

In operation, the invention provides for the growth of biological slimes on the surface of the rotating discs by alternatively immersing them in the wastewater for the bioextraction of nutrients and exposing them to the atmosphere for the absorption of oxygen. As the microorganisms in the slime grow, the thickness of the slime increases to the point where microorganisms adjacent to the disc surface become deprived of fresh nutrients and of oxygen. When this happens, anaerobic conditions ensue, gas is generated, and the slime sloughs off or is separated from the disc. If desired, the slime thickness can be controlled, rotating the discs periodically for a short time at an increased velocity to remove excessive growths.

Whether the slimes slough off naturally or are removed mechanically, such separated solids settle through the subjacent zone to the bottom of the tank. By thus providing for the use of a settling zone immediately subjacent to the rotating disc assemblies, the invention eliminates the necessity for construction of an additional settling tank. By utilizing this new and improved method and apparatus the treatment efficiency of existing treatment plants can be upgraded substantially without having to construct additional tank structures. Upgraded treatment efficiency, in accordance with the invention, can be incorporated into the primary or secondary sedimentation tanks of existing treatment plants by making such modifications, as will appear later.

When used in conjunction with primary or secondary settling tanks, the disc assemblies of the invention are placed sequentially along the upper zone of the tank in such a manner and forcibly rotated at such velocities as to pump the wastewater. The pumping of the wastewater along the surface of the tank by the action of the rotating discs of the invention insures that substantially all of the wastewater is brought into contact with the biological slimes on he disc surface so as to effect the removal of pollutants. The new and improved apparatus is therefore a multi-functional unit having a biological treatment zone in its upper portion and a settling zone for the removal of excessive slime in its lower portion. The apparatus of the invention typically includes a mechanism for the collection of the separated slime at the bottom of the multi-functional treatment unit.

BRIEF DESCRIPTION OF DRAWING

FIG. 1 is a diagrammatic cross sectional view of an apparatus of the invention taken along line 1—1 of FIG. 2.

FIG. 2 is a diagrammatical plan view of an apparatus of the invention.

FIG. 3 diagrammatically illustrates an alternate embodiment of the apparatus of FIGS. 1 and 2.

DESCRIPTION OF PREFERRED EMBODIMENT

Figure 4:
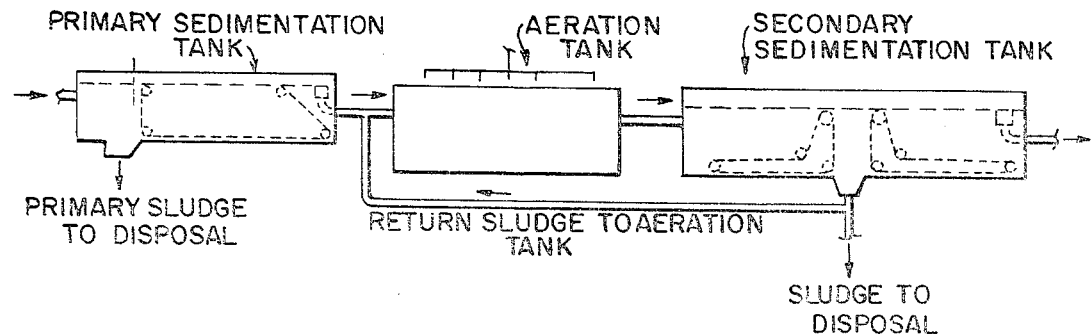
FIG. 4 is a flow diagram of a prior art activated sludge wastewater treatment plant.

In adapting existing wastewater clarification plants to the present invention and in designing new clarification plants, the following parameters should be considered: (1) the surface area for biological slime necessary to effect the desired degree of removal of pollutants, (2) the diameter of the discs, (3) the spacing of the discs on shafts, (4) the peripheral velocity of the discs, and (5) the physical dimensions of the tank to which the invention is applied, (6) the velocity of flow of wastewater through the biological treatment zone.

Referring to FIGS. 1 and 2 of the drawing, a tank unit 10 having a wastewater inlet 11 and treated wastewater outlet 12 is shown. The tank 10 can be either a primary settling tank, secondary settling tank or the complete clarification unit of an existing or new wastewater treatment plant. The wastewater supplied to the tank 10 can be either raw or partially treated domestic or industrial wastewater containing biochemically oxidizable pollutants.

The upper portion of tank 10 contains a plurality of parallel disc assemblies 13 which include a plurality of rotatably mounted shafts 14. Each shaft 14, in turn, supports a plurality of concentrically and fixedly mounted discs 15, which provide surface area upon which biological slimes may grow. The shafts 14 are preferably mounted above the usual level of wastewater in the tank unit to simplify mechanical construction, although submergence of the discs 15 can be varied from about ⅓ to ⅔ of their diameter. At the effluent end of the tank 10 an outlet weir 16 is provided to maintain a substantially constant level of wastewater in the tank.

Driving means (not shown) are provided to rotate shafts 14 to impart a predetermined peripheral velocity to the discs 15. Advantageously the driving means are capable of imparting rotational forces to shafts 14 variable in magnitude and direction. This allows for the accommodation of varying wastewater flow rates through the tank 10 and provides for the mechanical removal of excessive slime growth from the surface of discs 15, when and if desired.

The tank 10 is divided into two vertically adjacent treatment zones. The upper portion of the tank unit 10 encompassing the rotating disc assemblies 13 is operated to perform the biological function. The lower portion of tank 10 substantially between the bottom of the disc assemblies 13 and the bottom of the tank is provided as a subjacent sedimentation zone, generally indicated by the numeral 17, for the settling of excess slimes from the flow of wastewater being treated. Typically, a sludge collection mechanism 18 is provided at the bottom of the tank to remove the settled slime to a sump 19 for withdrawal to subsequent disposal (not shown). The sludge collection mechanism 18 can be chosen from those presently in widespread use.

In accordance with a specific aspect of the invention, one of the prime considerations in determining the diameter and peripheral velocity of the discs 15 is to utilize their capacity for pumping and circulating the wastewater to bring it in contact with the slimes. This pumping effect which is believed to result largely from the interfacial tension between the surfaces of the rotating discs and the wastewater, produces currents (generally indicated by arrows in FIG. 1) that cause substantially all of the wastewater to be brought into contact with the slimes on the disc surface for the bioextraction of pollutants.

Typically, in existing clarification tanks, the wastewater would travel toward the outlet end of the tank in a range of velocity between about 0.5 to 4 feet per minute. In accordance with the invention, the diameter of discs 15 should be chosen, and the assemblies rotated in the tank 10 at velocities to result in an increase of this velocity along the upper zone of the tank measured between the adjacent disc assemblies, to between about 2 to 30 feet per minute.

Another very important consideration in determining the size, immersion depth, and peripheral rotational velocity of the discs 15 is the maintenance of a relatively quiescent subjacent settling zone 17 for the removal of excess slime separated from the discs 15.

Specifically, it is preferred to limit the immersion depth of discs 15 to not more than one-half the depth of tank 10. A sufficient depth under the disc assemblies 13 should be afforded to perform the maintenance and repair work on the sludge collection mechanism as well as for providing a settling zone 17 adequately deep to separate and collect the excess slime when the discs are rotated at velocities contemplated by the invention. For practical purposes, the diameter of discs 15 will be between about 3 to 12 feet.

To encourage the growth of biological slimes by alternately immersing them in the wastewater and exposing them to the atmosphere, the disc assemblies 13 are rotated at a suitable predetermined velocity. From a practical standpoint, the peripheral velocity of the discs should not exceed about 3 feet a second, since greater velocities would disturb excessively the quiescence of the subjacent settling zone without providing means for controlling excessive currents which would affect adversely the settling function. On the other hand, the peripheral velocity must be sufficiently high to avoid excessive immersion of the biological slimes. To provide the microorganisms in the slime with oxygen sufficient to satisfy their metabolic processes, the immersion time of the slimes typically should not exceed about 10 seconds. As the wastewater becomes progressively clarified the immersion time of the slimes can be increased gradually to about 30 seconds. For smaller discs the peripheral velocity can be reduced substantially while avoiding excessive immersion time, while the larger diameter discs usually require that the rotational velocity be substantially increased to avoid excessive immersion time. Therefore, the preferred peripheral velocity of the discs 15 for normal operation should be between about 0.5 and 3 feet per second.

In accordance with the invention, the discs 15 should be spaced as close as practicable on shafts 14 in order to obtain maximum concentration of disc surface area per unit volume of disc assembly. However, allowance must be made for adequate contact time of the wastewater with the 1/16 inch to 1/4 inch thick slimes that develop on the disc surfaces. With these considerations in mind, the discs 15 should be spaced at least 1/2 inch on centers. A disc spacing of from about 3/4 to 1 1/2 inch on centers has been found to be suitable when treating normal domestic wastewater.

In accordance with a specific aspect of the invention, horizontal recirculation channel 19a may be provided along the longitudinal axis of tank 10. The channel 19a provides a means for the horizontal recirculation of wastewater along the tank surface.

Referring to FIG. 3, a modification of the tank 10 of FIGS. 1 and 2 is shown. Vertical baffles 20 are placed below the rotating disc assemblies 13. The baffles 20 serve the primary function of separating the subjacent settling zone of tank 10 into individual settling zones 21, for each disc assembly 13, thereby substantially preventing separated slimes from being carried forward and reabsorbed by subsequent slime covered discs which would reduce significantly the efficiency of pollutant removal. The baffles 20 should terminate at least far enough above the bottom of the tank 10 so as not to interfere with the operation of the sludge collection mechanism 18 and to provide for the recirculation of flow along the lower section of the tank.

With the above-mentioned function of baffles 20 in mind, it should be realized that other baffle configurations may also be utilized. Such configurations could include inclined baffles placed in an intermediate position under the disc assemblies.

FIG. 4 diagrammatically illustrates the main components of the conventional activated sludge process for the clarification of waterwater. Basically, the activated sludge system includes a primary tank for the removal of settlable solids from the raw wastewater followed by an aeration tank in which the primary tank effluent is aerated in the presence of an activated sludge floc which is subsequently separated from the treated wastewater in a secondary sedimentation tank. A major portion of the settled sludge from the secondary sedimentation tank is continuously returned to the aeration tank for reuse in clarifying the wastewater while the excess sludge is conducted to disposal.

In accordance with the invention, any or all of the treatment units of an activated sludge or modified aeration plant can be substantially upgraded in pollutant removal efficiency by incorporating therein the new and improved biological treatment facilities of the invention. Application of the invention to the primary settling tank of such plants can take the form of the embodiments illustrated in FIGS. 1 and 2 or 3 as previously described.

Figure 5:
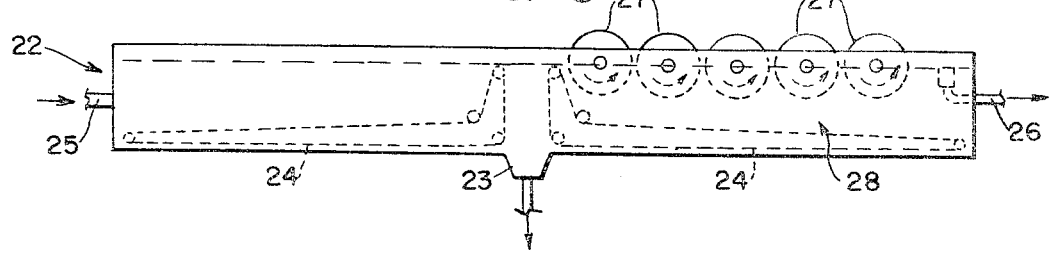
FIG. 5 diagrammatically illustrates the application of the invention to the secondary sedimentation tank of FIG. 4.

Particularly advantageous results are obtainable by applying the principles of the invention to the secondary sedimentation tank of the type shown in FIG. 4. In accordance with this aspect of the invention, it has been determined that the portion of this type of secondary sedimentation tank on the effluent side of the centrally located sludge sump performs a very small portion of the overall clarification work of the tank. By incorporating the new and improved apparatus of the invention into the effluent side of the secondary sedimentation tank of FIG. 4, this very low effluency sedimentation side can be transformed into a high efficiency biological treatment tank, without deleteriously affecting the relatively high efficiency of the influent sedimentation side. Referring to FIG. 5, a secondary sedimentation tank unit 22 of the type shown in FIG. 4 is indicated. The tank unit 22 has a centrally located sump 23 for the removal of settled solids and a pair of sludge collection mechanisms 24, for delivering the settled sludge to the sump 23. The influent wastewater to tank 22, which is typically the effluent from an aeration tank, enters through the inlet 25. The portion of the tank 22 extending from the inlet 25 to the sump 23 removes the major fraction of the settable matter from the flow entering the tank unit, while the remaining section of the tank unit 22, from the sump 23 to the wastewater outlet 26, removes the remaining solids. This is due, of course, to the fact that the influent section of the tank 22 removes the more readily settlable solids while the effluent portion of the tank unit removes the less settlable solids.

In accordance with the invention, the effluent portion of the tank unit 22 is provided with a plurality of disc assemblies 27 rotatably mounted in the upper zone of the tank unit and partially submerged in the wastewater. The disc assemblies 27 are installed similarly to those described in conjunction with FIGS. 1, 2 and 3, and include a plurality of discs, concentrically supported on a plurality of parallel shafts rotatably mounted in the upper zone of the tank. The discs are partially immersed in the wasterwater to a depth usually less than one-half of their diameter, although when relatively large diameter hollow shafts are utilized, the discs can be submerged to the top of such shaft and still expose all the slime on the discs to the atmosphere. Generally, the fraction of the disc immersed in the wastewater will lie in the range of about one-third to two-thirds of diameter.

In accordance with the invention, a subjacent settling zone 28, on the effluent side of the tank, is provided below the disc assemblies 27. In order to provide a quiescent environment for the settling of excess slime separated from the discs and to provide sufficient room for the repair and replacement of the sludge collection mechanism 24, the diameter of the discs is chosen so as not to extend substantially below the midpoint of the tank 22

The peripheral velocity of the discs is governed by the same parameters previously described, namely, the avoidance of too slow a velocity, which would result in the exhaustion of the oxygen in the slime by the microorganisms during each immersion and the avoidance of velocity so high that it would disturb significantly the quiescene of the subjacent settling zone. From a practical standpoint, the peripheral velocity of the discs should be kept in the range of about .5 to 3 feet a second, with about 1 foot per second normally suitable.

The following example illustrates the application of the invention to an existing secondary sedimentation tank of the type shown in FIG. 5. This tank is being used to treat 12 million gallons per day of wastewater, removing 60% of the 180 p.p.m. of carbonaceous B.O.D. in the raw wastewater by the modified aeration process.

Tank dimensions:
  300 feet long
  50 feet wide
  12 feet deep
  Sludge sump in center.
Based on maximum immersion period of 10 seconds and based on an average peripheral velocity of 1 foot per second, 6 foot discs would be suitable.

Based on a disc spacing of 1¼ inches and the shafts placed across the 50 foot width of the tank, the number of discs per shaft would be 480. Allowing space for bearings supporting the shaft, there would be approximately 450 discs per shaft.

Based on total effluent side tank length of 150 feet, it would be theoretically possible to use $$\frac{150}{6} = 25 \text{ shafts}$$

Allowing space for drive equipment and weir structures, it is possible to use only about 80% of theoretical number of shafts, or 20.

Since the slime area for a 6 foot diameter disc is 56 square feet, the total disc surface is 450 discs × 56 square feet × 20 shafts = 504,000 square feet. Experience indicates that this 504,000 square feet of disc surface would improve the plant removal efficiency from 60% to a range between 80% and 85%, when the discs are rotated at a peripheral velocity of about 1 foot per second.

Experience would indicate that a clearance of at least 6 feet should be provided between the bottom of the tank and the lower peripheral edge of the disc assemblies in order to permit the repair and maintenance of the sludge collection and removal mechanism.

It should be pointed out that as the concentration of B.O.D. in the wastewater decreases, which it does as the wastewater progresses downstream through the successive disc assemblies, the immersion time of the slimes may be increased. This will allow increasing the diameter of the discs of downstream assemblies, short of interfering with the headroom needed for the maintenance and repair of the sludge collection equipment below the disc assemblies.

Figure 6:
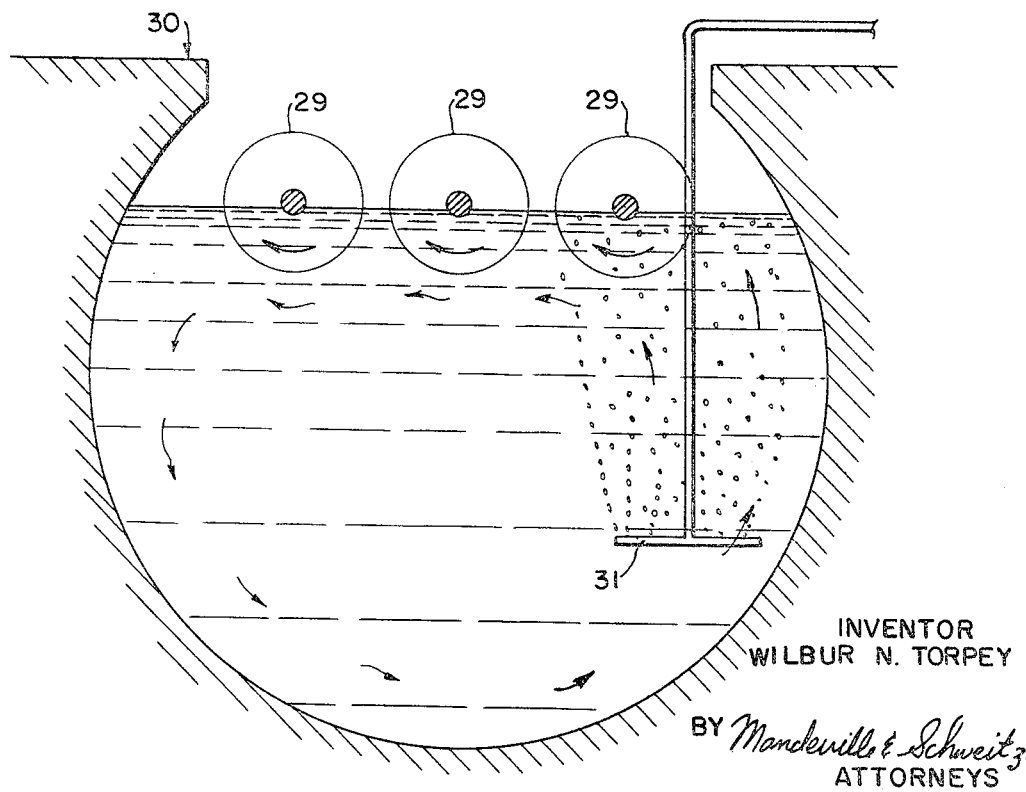
FIG. 6 is a diagrammatic cross sectional view of the aeration tank of FIG. 4 incorporating the invention.

The partially submerged rotating disc assemblies of the invention can be advantageously used in the aeration tank of an activated sludge plant, to improve the treatment efficiency. This application can be made in addition to previously described use in primary and/or secondary sedimentation tanks. In accordance with this aspect of the invention, which is schematically shown in FIG. 6, the rotational velocity of the discs can be optimized with respect to the economics and efficiency of treatment and without regard to disturbing the quiescence of the tank contents. Since the aeration tank of an activated sludge plant is normally turbulent because of the action of diffused air rising through the wastewater, the usual secondary sedimentation tank should serve the purpose of removing from the flow the separated slime and floc solids.

In accordance with this aspect of the invention, substantial savings in the operation of aeration tanks may be realized by incorporating the disc assemblies of the invention therein. This economic advantage is realized by providing sufficient disc surface area to substantially reduce the amount of diffused air required for a given degree of clarification. Since the cost of power for rotating disc surface is substantially less than the cost of power for compressing air, the aeration tank incorporating the invention is more economical to operate than the conventional aeration unit.

Referring to FIG. 6, which illustrates the application of the invention to an aeration tank, a series of rotatable disc assemblies 29 is shown extending longitudinally along the tank 30. The disc assemblies 29 include a plurality of discs supported on a plurality of longitudinal shafts. The longitudinal shafts are rotatably mounted in the upper portion of tank 30 and are journalled to a power source (not shown) for imparting to the discs a peripheral velocity of between about 0.5 and 3 feet per second or more. The factors determining the peripheral velocity of the discs are immersion time, and the avoidance of excessive slime accumulation at the bottom of the tank. For good slime growth, an immersion time of between 2 and 30 seconds is suitable.

Since the diffused air from supply 31 is sufficient to maintain the sloughed off slime in suspension, the slime is transferred to a subsequent settling tank for removal.

During operation of the treatment plant embodying the invention, wastewater is introduced into a tank incorporating the rotating disc assemblies of the invention. The level of wastewater in the tank is maintained at a constant level by an effluent weir located on the outlet of the tank. The usual surface velocity of the wastewater through the tank, i.e., the average velocity without rotation of the discs at a peripheral velocity between about 0.5 to 3 feet per second, in accordance with the invention, the surface velocity of the wastewater between disc assemblies is raised to between about 4 and 30 feet per minute. The increased surface velocity of the wastewater provided by the rotating discs causes the recirculation of at least a small portion of the wastewater towards the inlet end and through the disc assemblies to insure that all the flow is passed through the biological treatment zone.

In accordance with a specific aspect of the invention, the accumulated biological slime on the disc surface may be removed by periodically rotating the discs at peripheral velocities substantially in excess of those used normally. Advantageously, adjacent disc assemblies might be rotated in opposing directions when removing accumulated slime. Typically, accumulated slime may be removed from the discs by opposed high speed rotation approximately once a week in order to control the thickness of the slime on the discs.

In operation, it should be realized that wastewater treatment plants are subject to diurnal variations in flow. During the early morning hours, from about 2 a.m. to 6 a.m. the flow of wastewater to the plant can be and usually is a small fraction of that during daytime periods. In order to adapt the biological treatment plant of the invention to these variations in wastewater flow, an automatic control system can be provided to control the peripheral velocity of the discs to accommodate changes in flow rate without excessive recirculation.

The method and apparatus of the invention provides a relatively inexpensive and practical means for substantially upgrading wastewater treatment plants. The invention can be applied to primary and secondary sedimentation tanks as well as to the aeration tanks typically used in the activated sludge process. By incorporating the invention in primary sedimentation tanks, which remove only the settable solids from the raw wasterwater, a large portion of the B.O.D. that would remain can be removed at a relatively small cost. Treatment plants that are presently removing from 30–60% of the B.O.D. in the wastewater can be upgraded economically to remove from 80–99% of B.O.D. pollutants by applying the principles of the invention to the plant.

In addition to substantially upgrading existing wastewater treatment plants, the method and apparatus of the invention can be the basis for new plant design. A single tank wastewater treatment plant capable of removing over 90% of B.O.D. from wasterwater can be provided at a fraction of the cost of a conventional activated sludge or a trickling filter plant effecting the same degree of clarification.

It should be understood that the method and apparatus of the invention have been described in relation to specific applications for illustrative purposes only. Variations and modifications of the examples can be made without departing from the clear teachings and spirit of the invention.

Accordingly, reference should be made to the following appended claims in determining the full scope of the invention.

I claim:
1. A method for the continuous biological treatment of wastewater comprising
 (a) introducing said wastewater into a treatment tank having a substantial length dimension,
 (b) maintaining said wastewater at a predetermined depth in said treatment tank, and
 (c) forceably rotating a plurality of partially submerged disc members in said wasterwater, at a predetermined peripheral velocity suitable for the growth of aerobic biological slimes thereon, in the upper portion of said tank,
 (d) said disc members being mounted on a plurality of parallel, rotatable shafts spaced along the length dimension of said tank, transverse to the flow of wastewater through said tank,
 (e) said disc members defining a biological treatment zone in the upper portion of said treatment tank,
 (f) said disc members extending into said tank less than one-half of said predetermined depth of wastewater, thereby providing a settling zone in the lower portion of said tank subjacent to and substantially coextensive with said biological treatment zone,
 (g) said predetermined peripheral velocity being sufficient to force substantially all of said wastewater into said biological treatment zone, while maintaining said settling zone in a substantially quiescent state.
2. The method of claim 1, further including the steps of
 (a) removing biological slime from the surface of said disc members, and
 (b) settling the removed biological slime to the bottom of said treatment tank.

3. The method of claim 2, wherein
 (a) said settling step is accomplished by providing a quiescent settling zone immediately subjacent to said partially submerged discs.
4. The method of claim 1 wherein
 (a) said predetermined peripheral velocity is greater than about 0.5 feet per second and less than about 3.0 feet per second.
5. The method of claim 1 wherein
 (a) the directional component of said peripheral velocity at the lowermost submerged portion of said disc members is in the direction of wastewater flow through said treatment tank.
6. In an apparatus for the biological treatment of wastewater including a primary sedimentation tank, an aeration tank, a secondary sedimentation tank, conduit means interconnecting said primary sedimentation, aeration and secondary sedimentation tanks, a sump for the removal of settled sludge from the secondary sedimentation tank, and means for circulating sludge from the secondary sedimentation tank to the aeration tank, the improvement comprising
 (a) a plurality of discs rotatably mounted in said secondary sedimentation tank,
 (b) said discs being partially submerged in the wastewater during operation to not more than one-half of their diameter,
 (c) driving means for rotating said discs at a predetermined velocity,
 (d) said predetermined velocity being chosen to alternately expose the surface of said discs to wastewater in the tank and to the atmosphere at an interval sufficient to permit the growth of aerobic slimes on the surface of said discs.
7. The improved apparatus of claim 6, wherein
 (a) said discs are rotatably mounted in the upper half of said secondary sedimentation tank, and
 (b) said discs are between 3 and 12 feet in diameter.
8. The apparatus of claim 6, wherein
 (a) said sump is centrally located in said secondary tank.
9. The improved apparatus of claim 8, wherein
 (a) said discs are located only on the wastewater effluent side of said sump.
10. The improved apparatus of claim 7, wherein
 (a) said plurality of discs are mounted on a plurality of parallel shafts,
 (b) each shaft supports a plurality of said discs, thereby forming a series of parallel banks of rotatable disc assemblies mounted in the upper half of said secondary sedimentation tank.
11. The improved apparatus of claim 10, further including
 (a) a plurality of vertical baffles, each extending from below each of said rotatable disc assemblies to above the bottom of said secondary sedimentation tank.
12. A method for substantially upgrading the pollutant removal efficiency of primary and secondary wastewater settling tanks comprising
 (a) providing a biological treatment zone in the upper portion of said tank,
 (b) maintaining a settling zone in the lower portion of said tank,
 (c) said biological treatment zone including a plurality of rotatably mounted parallel shafts mounted across said settling tank transverse to the direction of wastewater flow and a plurality of disc members mounted on each of said parallel shafts,
 (d) said disc members extending into the wastewater less than one-half the wastewater depth, and
 (e) rotating said disc members at a peripheral velocity adequate to permit the growth of aerobic biological slimes on the surface of said disc members, (f) said peripheral velocity being sufficient to create a return flow of wastewater in said settling zone countercurrent to the flow of wastewater through said biological treatment zone, (g) whereby substantially all of said wastewater entering said tank flows through said biological treatment zone.

13. The method of claim 12, wherein (a) said disc members are submerged in said wastewater to less than one-half of their diameter.

14. The method of claim 12 wherein (a) said peripheral velocity is greater than about 0.5 feet per second and less than about 3 feet per second.

References Cited

UNITED STATES PATENTS

| 2,559,704 | 7/1951 | Bevan | 210—11 |
| 2,798,042 | 7/1957 | Cox | 210—13 |
| 3,335,081 | 8/1967 | El-Naggar | 210—17X |
| 3,428,555 | 2/1969 | Kitagawa et al. | 210—17X |
| 3,466,241 | 9/1969 | Simpson | 210—151X |
| 2,934,325 | 4/1960 | Haglund | 261—92 |

MICHAEL ROGERS, Primary Examiner

U.S. Cl. X.R.

210—17, 151, 195, 262

UNITED STATES PATENT OFFICE
CERTIFICATE OF CORRECTION

Patent No. 3575849        Dated April 20, 1971

Inventor(s) Wilbur N. Torpey

It is certified that error appears in the above-identified patent and that said Letters Patent are hereby corrected as shown below:

Column 3 line 2 should read, mersed in the wastewater. Biological slimes are encouraged to grow on the rotating bodies Column 4 line 2 "he" should read the Column 6 line 56 "effiuency" should read efficiency Column 7 line 10 change "wasterwater" to wastewater Column 9 line 20 change "wasterwater" to wastewater Signed and sealed this 24th day of August 1971.

(SEAL)
Attest:

EDWARD M. FLETCHER, JR.
Attesting Officer

WILLIAM E. SCHUYLER, JR
Commissioner of Patents